Patented Dec. 30, 1952

2,623,866

UNITED STATES PATENT OFFICE 2,623,866

RESINOUS MATERIAL FROM A PHENYL BORATE AND AN ALDEHYDE

Sumner B. Twiss, Huntington Woods, and Adam P. Sporzynski, Detroit, Mich., assignors to Chrysler Corporation, Highland Park, Mich., a corporation of Delaware No Drawing. Application May 26, 1951, Serial No. 228,525

19 Claims. (Cl. 260—37)

This invention relates to an improved synthetic plastic composition and method of making the same and this application is a continuation in part of our application Serial No. 164,618.

More particularly, the invention pertains to an improved thermosetting resinous material which may be employed as the resin base or constituent in coating, molding, impregnating and bonding compositions as well as in compositions for diverse other purposes including brake and clutch linings, high temperature resistant gaskets, impregnants for fiber glass, and electrical insulation.

One of the main objects of the invention is to provide thermosetting resinous material which will withstand elevated temperatures without undergoing alteration of its physical characteristics and which will impart these qualities to compounds in which it is included as a resin base or as a substantial constituent.

Another object of the invention is to provide a synthetic, thermosetting resinous material that can be advantageously used in substantially all applications for which phenol-aldehyde types of resins are adapted and which has substantially greater heat resistance and non-flammability than conventional phenol-aldehyde and other resins.

A further object of the invention is to provide a synthetic, thermosetting resin compound which requires, in addition to the reaction agents utilized in the manufacture of phenolic resins, only relatively inexpensive and plentiful reaction agents.

Another object of the invention is to provide an improved method of manufacturing heat and flame resisting plastic materials.

It has been found that marked improvements in the heat resisting and non-flammability characteristics of phenolic type thermosetting resins may be inexpensively and economically obtained by employing a substantial quantity of a preformed reaction product of phenol and a boron bearing compound or compounds as an agent in a subsequent reaction by which such resins are produced. The boron bearing compound may comprise boric acid, boron oxide, borax, pyroboric acid, boron halides or combinations thereof. The boron bearing agent is initially reacted with phenol to produce either diphenyl borate or triphenyl borate and the phenyl borate compound thus produced may subsequently be reacted with an aldehyde such as formaldehyde. The aldehyde employed in the above reaction may comprise formaldehyde, paraformaldehyde, formalin or hexamethylene tetra amine. Acetaldehyde, higher aliphatic aldehydes, and tetra hydrofurfuraldehyde may be used but all do not produce as great heat resistance as formaldehyde derivatives.

The following are examples of various procedures by which the improved resin may be produced.

Example I

The improved resin material may be formed by reacting in an open vessel, or in a closed vessel with provision for removal of water formed during the reaction, a mixture of 50 parts by weight of triphenyl borate and 24 parts by weight of paraformaldehyde at a temperature of about 125° C. to 135° C. for approximately 2 hours. The ratio of the triphenyl borate to the formaldehyde in parts by weight is thus approximately two to one. The triphenyl borate may be prepared by heating 70 parts by weight of phenol and 10 parts by weight of boric acid at about 100° C. for approximately one-half hour or until the boric acid goes into solution. When diphenyl borate is used in place of triphenyl borate the same procedure is followed using a molecular equivalent amount of diphenyl borate or approximately 37 parts by weight.

Example II

A softer, more shock resisting resinous material embodying the invention may be produced with some accompanying reduction in its heat resisting qualities by substituting an aliphatic alcohol, preferably one containing 8 to 18 carbon atoms, for some of the phenol in the preparation of the borate ester set forth in Example I. This may be accomplished by reacting in a vessel as set forth above 50 parts by weight of phenol and 25 parts by weight of an aliphatic alcohol such as n-decyl alcohol and 10 parts by weight of boric acid at a temperature of about 100° C. for approximately one hour. In place of decyl alcohol, other aliphatic alcohols may be used in equivalent molecular proportions, such as octyl, dodecyl, myristyl, cetyl, octadecyl alcohols and branched chain analogues of these alcohols. To the above preformed reaction product is then added about 15 to 20 parts by weight of paraformaldehyde and this mixture is reacted by heating it at 130° C. to 140° C. for one and a half to two hours. The use of alcohol in the production of this form of the improved resin material results in an increase in the plasticity of the final compounded product without significantly reducing its electrical insulating properties.

Example III

A resinous material embodying the invention and possessing improved properties for brake lining application may be produced by substituting cashew nut shell liquids, preferably polymerized cashew nut shell liquids, for some of the phenol in the preparation of the borate ester as set forth in Example I. This may be accomplished by reacting in a vessel as set forth above 50 parts by weight of phenol and 10 parts by weight of boric acid at a temperature of 110° C. for approximately one-half hour. To the above reaction product is then added about 2 parts by weight of polymerized cashew nut shell liquid dissolved in 10 cc. of xylene plus 15 parts by weight of paraformaldehyde and this mixture is reacted by heating it at 130° C. to 140° C. for one hour. The use of cashew nut shell liquids of this form of the improved resin material results in an increase in the water resistance without reducing its heat resistance. Larger proportions of cashew nut shell liquids have a greater effect in increasing water resistance, but tend to reduce heat resistance.

In all of the foregoing examples and in the various modifications thereof, any one or a combination of the above mentioned and other boron bearing compounds may be substituted in approximately equivalent molecular amounts for the boric acid to produce the phenyl borate. The phenol employed in these examples may be replaced by any one or various combinations of the following: an alkyl substituted phenol, such as octyl phenol, para tertiary butyl phenol, polyhydric phenols such as resorcinol, hydroquinone, pyrogallol, catechol and alkyl substituted polyhydric phenols, and phenols derived from cashew nut shell liquid. The latter phenols are found to increase water resistance.

The resin material produced in the foregoing manner may be used as a resin base in a large number of different resin compounds which may be compounded to serve a vast number of purposes. The resin material obtained as above set forth may be classed as an "A" stage resin and it is in solid state at atmospheric conditions. It can be readily reduced to finely divided powdered form by grinding in a conventional manner and incorporated in numerous different compounds to add heat and flame resistance as well as electric resistance and insulating properties to the final products produced from such compounds.

In the production of resin molding powders, 5 parts by weight of any of the resin material produced as above set forth may be mixed dry or wet with 15 parts by weight of powdered asbestos. When the resin is mixed in dry state with the powdered asbestos, the resin is powdered in advance, and when it is mixed wet, it is preferably dissolved or dispersed in advance in a suitable volatile vehicle such as acetone, benzene, toluene, ketones. As in conventional molding powders, small amounts of acidic or basic catalysts may be incorporated at this stage to accelerate resin cure and promote infusibility and insolubility in the final product. Catalysts used for this purpose include dilute sulfuric acid, phosphoric acid, oxalic acid, hexamethylene tetra amine, and other suitable acids or bases. The vehicle is evaporated after mixing the asbestos and resin solution or dispersion. The foregoing proportions of resin material and asbestos are set forth as an example, and it should be understood that the resin and asbestos content may vary over a wide range including from 50% to 5% resin and 50% to 95% filler, depending upon the intended use of the resulting product. Fillers other than asbestos may also be used such as, clays, powdered ceramics, vermiculite, fiberglass, carbon blacks and other fillers suitable to the particular use to be made of the resin compound.

The above dry mixture of asbestos and the improved resin may be heated for about 15 minutes at approximately 150° C. and under atmospheric pressure to precure the resin content of the mixture. The above wet mixture of asbestos and the improved resin may be heated at 100° C. in a vacuum for 15 to 30 minutes, or until the solvent is removed, and then heated for about 15 minutes at approximately 150° C. and under atmospheric pressure to precure the resin content of the mixture. The precured mixture may then be heated for about 3 minutes at approximately 100° C. under vacuum of about 2 inches of mercury. The latter step removes any water that may have been present. The molding powder is then reground to a desired particle size suitable to produce the required flow properties.

The following are further examples of the invention:

*Example IV*

Place 290 parts (1 mol) of triphenyl borate in a 3-neck 1 liter flask equipped with a stirrer, thermometer and a Barrett adapter for the determination of water formed during the reaction. The ester is stirred and heated to 125 to 135° C. and then approximately 135 parts (4.5 mols) of fast-reacting paraformaldehyde are gradually added at that temperature. The rate of the condensation reaction may be conveniently determined by measuring the amount of water collected in the adapter. The total time of reaction amounts to 3 to 4 hours. The residue in the flask is then cooled down. This yields a brittle, yellow transparent resin which can readily be reduced to powdered form by grinding in the conventional manner. The resin is insoluble in water and is soluble in common organic solvents. It can be cured by the application of heat, aided if desired by pressure. By this procedure better control is maintained than in the case of Example I, particularly when reacting large quantities of the material.

*Example V*

A resinous material prepared as described in Example IV may be produced more conveniently by carrying out the condensation reaction in a solvent medium. Aromatic hydrocarbons such as toluene, xylene, or trimethyl benzene may be used for this purpose, their action being that of moderators preventing a sudden rise in temperature. Furthermore, the use of solvents prevents solidification of the formed resin on cooling thus making the handling operation much easier to perform. In accordance with this example 145 parts (½ mol) of triphenyl borate dissolved in about 400 parts by weight of toluene is placed in a vessel as set forth above and the mixture is heated to 90° C. Approximately 65 parts (2.2 mols) of fast-reacting paraformaldehyde is then added maintaining the temperature of reaction between 90° to 110° C. The rate of the condensation reaction may be conveniently determined by measuring the amount of water collected in the adapter. The heating is continued for 2 to 3 hours and the resin solution is then diluted with a mixture of 80 parts of toluene and 80 parts of tertiary butyl alcohol or other alcohols which boil in the same range. The resulting solution may then be processed in the usual manner with inorganic fillers to produce molding compositions. The addition of tertiary butyl alcohol increases solubility of the resin in aromatic hydrocarbons.

*Example VI*

A resinous material embodying the invention and possessing improved properties may be produced by adding a small amount of polymerized cashew nut shell liquid to the triphenyl borate prior to condensation with paraformaldehyde. The use of cashew nut shell liquids results in increased toughness and water resistance of the resin without reducing its heat resistance.

Dissolve 145 parts (½ mol) of triphenyl borate and 6 parts of polymerized cashew nut shell liquid in about 400 parts by weight of toluene in a vessel as set forth above and heat the mixture to 90° C. Approximately 65 parts (2.2 mols) of fast-reacting paraformaldehyde is then added maintaining the temperature of the reaction between 90 to 110° C. The heating is continued for 2 to 3 hours until practically no further water comes over. The resin solution is then diluted with a mixture of 80 parts toluene and 80 parts of tertiary butyl alcohol. Larger proportions of polymerized cashew nut shell liquid may be used to modify properties of the resin if desired.

Example VII

A resinous material embodying the invention may conveniently be produced by reacting a 2 to 1 molar ratio of phenol to boric acid in the presence of an azeotropic agent, such as toluene, or xylene, until the amount of water taken off indicates the substitution of two hydroxyl groups in boric acid with phenoxy groups and then reacting the thus formed diphenyl borate with paraformaldehyde.

Using 3 to 1 molar ratio of phenol to boric acid with the addition of an efficient azeotropic agent it is possible to substitute all three hydroxyl groups in boric acid with phenoxy groups to form triphenyl borate. However, substitution of the last remaining hydroxyl group is much slower than the replacement of the first two and therefore it may be desirable to stop the esterification reaction at the diester stage.

When 320 parts (3⅓ mols) of phenol and 93 parts parts (1½ mols) of boric acid are placed in a vessel as set forth above and the mixture is stirred and heated until three mols of water are split out, the following table represents a typical run:

| Time (hrs.) | Pot Temperature (° C.) | Total Parts of Distillate |
|---|---|---|
| ⅓ | 143 | 14 |
| ½ | 150 | 20 |
| ¾ | 160 | 30 |
| 1 | 165 | 38 |
| 1½ | 175 | 49 |
| 2 | 183 | 56 |
| 3 | 190 | 63 |
| 3½ | 192 | 65 |

The distillate consists of two layers: top water layer amounting to 57 parts and bottom phenol layer amounting to 8 parts. Taking into consideration the amount of phenol dissolved in aqueous layer and the amount of water dissolved in phenolic layer—total volume of water taken off amounts to 54 parts. This is equal to the calculated amount of water which would be split from 1½ mols of boric acid with the formation of diphenyl borate.

The residue in the flask is cooled below 120° C., 15 parts of polymerized cashew nut shell liquid dissolved in 160 parts of toluene is added and the mixture is refluxed for one hour. Approximately 120 parts (4 mols) of fast-reacting paraformaldehyde is then gradually added with the reaction mass held between 90 to 100° C. and heating is continued for about 3 to 4 hours until practically no further water comes over. The resin solution is then diluted with a mixture of about 120 parts of toluene and 120 parts of tertiary butyl alcohol to form a solution suitable for wet molding operation.

Although a molar ratio of 3 to 1 of phenol and boric acid is preferred to form the phenyl borate for use in preparing a resinous material, most resistant to elevated temperatures, larger amounts of phenol may be employed if desired. In this case, a decrease in temperature resistance is to be expected, but otherwise no serious difference in handling or resultant properties of the resinous material is found.

A representation of the initial reaction which forms an A-stage resin from formaldehyde and either triphenyl borate or diphenyl borate is set forth hereinafter. It is, however, to be understood that this is merely a hypothetical structure of the A-stage resin for it is not possible to determine the exact structure of such a complex product.

These initial condensation products or A-stage resins will, upon further heating with formalde-

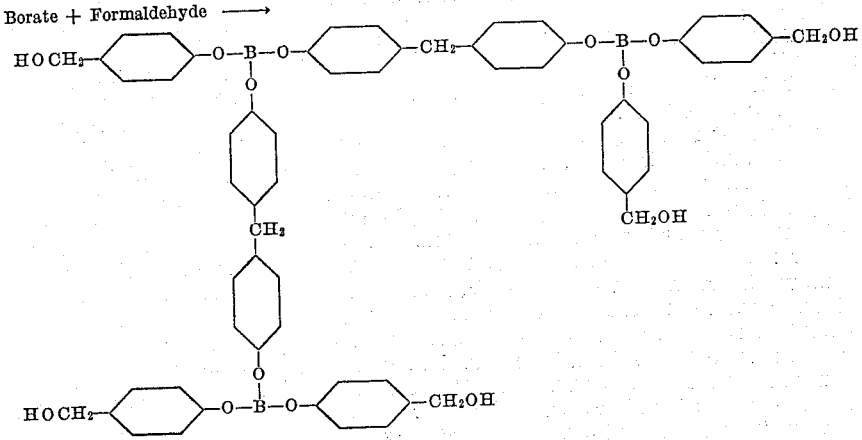

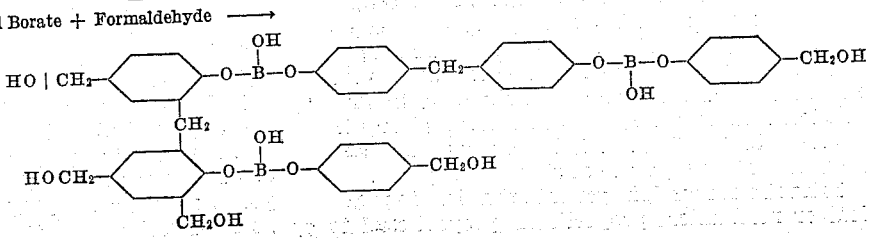

hyde condense further to form cross-linked infusible products in the following manner (as shown in the following Examples M and N, using triphenyl borate and diphenyl borate, respectively:

*Example M*

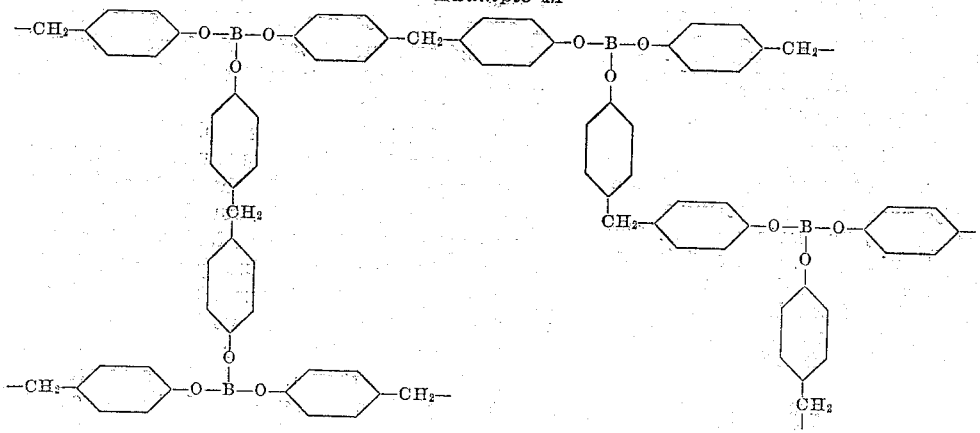

*Example N*

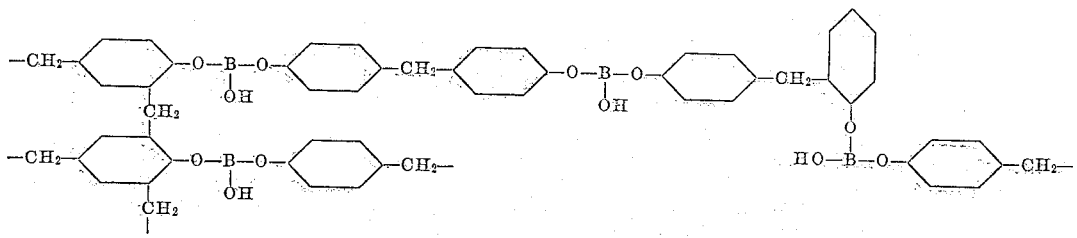

The same name will be employed for the final condensation product as for the A-stage resins; namely, poly anhydro polymethylol tri (or di) phenyl borates.

One of the unique features of these resinous materials is improved heat resistance which is defined in the following manner: Heat resistance as used in this application for a resinous material means substantial retention of physical and mechanical properties of molded specimens after exposure to elevated temperatures for varying time intervals. Two experimental techniques have been employed in the evaluation of heat resistance:

1—Determination of weight loss of specimens on heating.

2—Determination of tensile strength after high temperature exposure.

In the first method, exposure at 325° C. (617° F.) for sixteen hours was chosen for test since conventional asbestos-filled molded phenolic compositions lose about 100% of their phenolic resin binder under these conditions. The samples of our invention lose only 25 to 35% of their resinous binder under the same test conditions.

In the second method of evaluating heat resistance, tensile strengths of asbestos filled compositions were determined before and after exposure for sixteen hours at 325° C. Conventional phenolic compositions have exhibited a decrease from an initial value of 6500 p. s. i. before exposure to a negligible value of 50 p. s. i. after exposure. This practically complete loss of strength of phenolic composition may be contrasted with the improved behavior of the products of this invention which initially exhibited tensile strengths of 7,000 to 10,000 p. s. i. before exposure and strengths after exposure of about 3,600 p. s. i.

It has been found, in general, that loss in physical or mechanical properties is proportional to the weight loss of a specimen exposed at an elevated temperature for the same time-temperature conditions. Weight loss at 325° C. for sixteen hours has been used as a primary criterion of heat resistance.

Although but several specific embodiments of our invention have been described, it is understood that various changes in the materials employed and in the sequence of steps as well as in the temperature, periods of heating and amounts of materials may be made without departing from the spirit of our invention.

We claim:

1. A thermosetting resinous material comprising the heat reaction product of an aldehyde and a preformed polyphenyl borate selected from the group of phenyl borates consisting of diphenyl borate and triphenyl borate.

2. A thermosetting resinous material comprising the heat reaction product of formaldehyde and a preformed polyphenyl borate selected from the group of phenyl borates consisting of diphenyl borate and triphenyl borate.

3. A thermosetting resinous material comprising the heat reaction product of formaldehyde and triphenyl borate.

4. A thermosetting resinous material comprising the heat reaction product of formaldehyde and diphenyl borate.

5. A thermosetting resinous condensation product of a minor portion by weight of formaldehyde and a major portion by weight of a preformed polyphenyl borate selected from the group of polyphenyl borates consisting of diphenyl borate and triphenyl borate.

6. A thermosetting resinous condensation product of approximately one part by weight of formaldehyde to two parts by weight of a preformed polyphenyl borate selected from the group of polyphenyl borates consisting of diphenyl borate and triphenyl borate.

7. A method of producing a fusible heat resistant resinous condensation material which comprises reacting an aldehyde with a polyphenyl borate selected from the group of phenyl borates consisting of diphenyl borate and triphenyl borate, and at a temperature substantially between 125° to 140° C.

8. A heat resistant resinous product comprising a permanently cured resinous condensation product of an aldehyde, a polyphenyl borate selected from the group of phenyl borates consisting of diphenyl borate and triphenyl borate, and dispersed asbestos, said aldehyde being present in the proportion of one part thereof by weight to approximately one and one-half to two parts by weight of the polyphenyl borate and the asbestos being present in an amount by weight of at least the weight of the resin content, said product being characterized by the retention of its physical and mechanical properties even after exposure to elevated temperatures for varying time intervals.

9. A thermosetting resinous material comprising the heat reaction product of an aldehyde and a preformed borate ester having at least two phenyl substituent groups and in which ester any substituent group independent of and in excess of said two phenyl groups is a hydrocarbon group.

10. A thermosetting resinous condensation product of formaldehyde and a preformed polyphenyl borate having at least two phenyl substituent groups and in which borate any substituent group independent of and in excess of said two phenyl groups is a hydrocarbon group, said reaction product being formed at approximately 125° C. to 140° C.

11. A resinous material comprising the heat reaction product of formaldehyde, and a preformed borate ester having two phenyl substituent groups and an aliphatic hydrocarbon substituent group, the said ester being the heat reaction product of phenol, an aliphatic alcohol having 8 to 18 carbon atoms and a boron bearing compound selected from the group of compounds consisting of boric acids and boron halides.

12. A thermosetting resinous material comprising the heat reaction product of formaldehyde, polymerized cashew nut shell liquid, and a preformed borate ester having at least two phenyl substituent groups and in which ester any substituent group independent of and in excess of said two phenyl groups is a hydrocarbon group.

13. The method of forming a resin which consists in heat reacting an aldehyde with a solution of a preformed polyphenyl borate in a solvent comprising a mixture of aromatic hydrocarbons and alcohols having a boiling range of approximately 80° C. to 120° C., said borate having at least two phenyl substituent groups and any substituent group independent of and in excess of said two phenyl groups being a hydrocarbon group.

14. The method of forming a resin which consists in heat reacting an aldehyde with a solution of preformed polyphenyl borate in a solvent comprising a mixture of 60% toluene and 40% tertiary butyl alcohol, said borate having at least two phenyl substituent groups and any substituent group independent of and in excess of two phenyl groups being a hydrocarbon group.

15. The method of producing a resinous material which comprises heat reacting an aldehyde with a borate ester selected from the group of borate esters having at least two phenyl substituent groups, any substituent group of said ester which is independent of and in excess of said two phenyl groups being a hydrocarbon group.

16. A resin molding powder comprising a mixture of an inert filler and the fusible heat reaction product of formaldehyde and a preformed polyphenyl borate having at least two phenyl substituent groups and in which borate any substituent group independent of and in excess of said two phenyl groups is a hydrocarbon group.

17. A resinous material comprising the heat reaction product of an aldehyde and a preformed borate ester having at least two phenyl substituent groups and in which ester any substituent group independent of and in excess of said two phenyl groups in a hydrocarbon group, the said ester being the heat reaction product of a boron bearing compound selected from the group consisting of orthoboric acid, boron oxide, borax, pyroboric acid and boron halides, with a member of the group consisting of unsubstituted monohydric phenols, alkyl substituted monohydric phenols, polyhydric phenols and phenols obtained from cashew nut shell liquid.

18. A thermosetting resinous material comprising the heat reaction product of an aldehyde and a preformed borate ester having at least two phenyl groups attached to boron through oxygen linkages and having a third similarly attached group selected from the group consisting of phenyl, alkyl substituted phenyl and aliphatic hydrocarbon groups.

19. A thermosetting resinous material comprising the heat reaction product of an aldehyde and a preformed borate ester derived from a boron bearing compound having three oxygen-linked atoms, at least two of said oxygen atoms having attached thereto phenyl groups and the third having attached thereto a group obtained from an unsubstituted aliphatic alcohol.

SUMNER B. TWISS.
ADAM P. SPORZYNSKI.

REFERENCES CITED

The following references are of record in the file of this patent:

UNITED STATES PATENTS

| Number | Name | Date |
| --- | --- | --- |
| 1,439,056 | Baekeland | Dec. 19, 1922 |
| 1,678,107 | Deutsch | July 24, 1928 |